(12) United States Patent
Minn et al.

(10) Patent No.: US 10,315,585 B2
(45) Date of Patent: Jun. 11, 2019

(54) ADJUSTABLE PORTABLE DEVICE HOLDER

(71) Applicant: Kenu, Inc., San Francisco, CA (US)

(72) Inventors: Kenneth Y. Minn, San Francisco, CA (US); David E. Yao, San Francisco, CA (US)

(73) Assignee: Kenu, Inc., San Francisco, CA (US)

( * ) Notice: Subject to any disclaimer, the term of this patent is extended or adjusted under 35 U.S.C. 154(b) by 0 days.

(21) Appl. No.: 15/967,113

(22) Filed: Apr. 30, 2018

(65) Prior Publication Data

US 2018/0244211 A1    Aug. 30, 2018

Related U.S. Application Data

(63) Continuation of application No. 15/653,897, filed on Jul. 19, 2017, now Pat. No. 9,956,923, which is a (Continued)

(51) Int. Cl.
    B60R 11/02      (2006.01)
    F16M 13/02      (2006.01)
    (Continued)

(52) U.S. Cl.
CPC .......... B60R 11/02 (2013.01); B60R 11/0241 (2013.01); F16B 2/065 (2013.01); F16M 11/041 (2013.01); F16M 11/105 (2013.01); F16M 13/00 (2013.01); F16M 13/022 (2013.01); B60R 11/0258 (2013.01); B60R 2011/0008 (2013.01); B60R 2011/0059 (2013.01); B60R 2011/0071 (2013.01); B60R 2011/0085 (2013.01);
(Continued)

(58) Field of Classification Search
CPC ............... B60R 7/06; B60R 2011/0005; B60R 2011/0008; B60R 11/0241; B60R 11/0258; B60R 2011/0294; B60R 2011/0059; B60R 2011/0071; B60R 2011/0085; B60R 11/02; Y10S 224/929; B60H 3/0028
USPC ............... 224/483, 556, 275, 929, 544, 276; D12/415, 419–420; D14/253; D23/366, D23/368
See application file for complete search history.

(56) References Cited

U.S. PATENT DOCUMENTS

| 2,580,625 A | 1/1952 | Waltz |
| 4,523,870 A | 6/1985 | Spector |
| (Continued) | | |

FOREIGN PATENT DOCUMENTS

| CN | 301670390 | 9/2011 |
| CN | 202907016 U | 4/2013 |
| (Continued) | | |

OTHER PUBLICATIONS

US 7,389,443 B1, 06/2008, Jaworski (withdrawn)
(Continued)

*Primary Examiner* — Scott T McNurlen
(74) *Attorney, Agent, or Firm* — Vierra Magen Marcus LLP

(57) ABSTRACT

Adjustable portable device holders are herein disclosed. According to one embodiment, an adjustable portable device holder includes an adjustable clamping element and a rotatable mounting element attached to the adjustable clamping element for removably securing a portable device to the adjustable portable device holder.

8 Claims, 5 Drawing Sheets

Related U.S. Application Data continuation of application No. 14/736,090, filed on Jun. 10, 2015, now Pat. No. 9,718,412, which is a continuation of application No. 13/897,062, filed on May 17, 2013, now Pat. No. 9,080,714, which is a continuation-in-part of application No. 29/437,793, filed on Nov. 20, 2012, now Pat. No. Des. 690,707.

(51) Int. Cl.
| | |
|---|---|
| F16M 11/04 | (2006.01) |
| F16M 11/10 | (2006.01) |
| F16M 13/00 | (2006.01) |
| F16B 2/06 | (2006.01) |
| B60R 11/00 | (2006.01) |

(52) U.S. Cl.
CPC .... B60R 2011/0294 (2013.01); Y10S 224/929 (2013.01); Y10T 29/49826 (2015.01); Y10T 29/49963 (2015.01)

(56) References Cited

U.S. PATENT DOCUMENTS

| | | |
|---|---|---|
| 4,797,916 A | 1/1989 | Kojima |
| 4,840,773 A | 6/1989 | Wade |
| 5,109,411 A * | 4/1992 | O'Connell .......... B60R 11/0241 224/553 |
| 5,305,381 A | 4/1994 | Wang |
| 5,338,252 A | 8/1994 | Bowler et al. |
| 5,820,792 A | 10/1998 | Lin |
| D403,420 S * | 12/1998 | Vullion .......... D23/367 |
| 5,979,724 A | 11/1999 | Loewenthal et al. |
| 6,085,113 A * | 7/2000 | Fan ............. B60R 11/0241 379/426 |
| 6,103,201 A | 8/2000 | Green |
| 6,123,935 A | 9/2000 | Wefler et al. |
| 6,149,116 A | 11/2000 | Won |
| 6,254,065 B1 | 7/2001 | Ehrensperger et al. |
| 6,256,387 B1 | 7/2001 | Wang |
| 6,264,887 B1 | 7/2001 | Farmer |
| 6,366,672 B1 | 4/2002 | Tsay |
| 6,441,872 B1 * | 8/2002 | Ho ............ B60R 11/0235 224/483 |
| 6,514,467 B1 | 2/2003 | Bulsink et al. |
| D482,039 S | 11/2003 | Chen et al. |
| D485,340 S | 1/2004 | Wu |
| 6,932,331 B1 | 8/2005 | Fan |
| 6,988,907 B2 | 1/2006 | Chang |
| D521,990 S | 5/2006 | Richter |
| D522,843 S | 6/2006 | Richter |
| 7,061,386 B2 | 6/2006 | Seresini |
| 7,080,812 B2 | 7/2006 | Wadsworth |
| 7,140,553 B2 | 11/2006 | Zobele |
| D538,912 S | 3/2007 | Kaplan |
| D538,913 S | 3/2007 | Kaplan |
| 7,272,984 B2 | 9/2007 | Fan |
| 7,284,737 B2 | 10/2007 | Kane |
| D566,590 S | 4/2008 | Stevens et al. |
| D589,962 S | 4/2009 | Maruyama et al. |
| 7,537,190 B2 | 5/2009 | Fan |
| 7,584,393 B2 | 9/2009 | Kamada et al. |
| 7,621,511 B2 | 11/2009 | Hayes-Pankhurst et al. |
| D611,478 S | 3/2010 | Richardson et al. |
| D614,613 S | 4/2010 | Kim et al. |
| D626,541 S | 11/2010 | Kim et al. |
| 7,854,393 B2 | 12/2010 | DiBello et al. |
| D630,222 S | 1/2011 | Lin |
| D633,040 S | 2/2011 | Le et al. |
| D643,407 S | 8/2011 | Behringer et al. |
| D645,033 S | 9/2011 | Quong et al. |
| D655,692 S | 3/2012 | Silverman et al. |
| D656,931 S | 4/2012 | Wikel |
| D656,940 S | 4/2012 | McClelland et al. |
| D657,356 S | 4/2012 | Wikel |
| D657,364 S | 4/2012 | Norman |
| D663,726 S | 7/2012 | Gourley |
| D663,735 S | 7/2012 | Musselman |
| D664,147 S | 7/2012 | Zhao et al. |
| D670,295 S | 11/2012 | Prescott et al. |
| D671,950 S | 12/2012 | Richter |
| D689,041 S | 9/2013 | Hampf |
| D690,707 S | 10/2013 | Minn et al. |
| D692,897 S | 11/2013 | Luijben |
| 8,727,192 B2 | 5/2014 | Lai |
| 8,757,461 B2 | 6/2014 | Zanetti |
| D708,603 S | 7/2014 | Kim et al. |
| D709,074 S | 7/2014 | Tsui et al. |
| D713,398 S | 9/2014 | Alesi et al. |
| D715,790 S | 10/2014 | Conomos et al. |
| D715,791 S | 10/2014 | Yu |
| 8,857,687 B1 | 10/2014 | An |
| D716,788 S | 11/2014 | Volkan |
| D717,289 S | 11/2014 | Takabatake |
| D718,298 S | 11/2014 | Aspinall et al. |
| D720,759 S | 1/2015 | Deng et al. |
| D723,311 S | 3/2015 | Jiang et al. |
| D724,072 S | 3/2015 | Jiang et al. |
| D726,175 S | 4/2015 | Tsai et al. |
| D733,548 S | 7/2015 | Brown et al. |
| D735,112 S | 7/2015 | Deng et al. |
| 9,080,714 B2 | 7/2015 | Minn et al. |
| 9,123,935 B2 | 9/2015 | Huang |
| D750,612 S | 3/2016 | Chen |
| D750,633 S | 3/2016 | Minn et al. |
| D765,646 S | 9/2016 | Deng et al. |
| D765,651 S | 9/2016 | Liu et al. |
| D778,714 S | 2/2017 | MeSweyn et al. |
| 9,573,531 B2 | 2/2017 | Zhang |
| 9,586,530 B2 | 3/2017 | Kim |
| 9,718,412 B2 | 8/2017 | Minn et al. |
| 9,956,923 B2 | 4/2018 | Minn et al. |
| 2003/0175172 A1 | 9/2003 | Altmann |
| 2004/0175312 A1* | 9/2004 | Linden-Douw ...... B60H 3/0007 422/306 |
| 2004/0247301 A1 | 12/2004 | Yip et al. |
| 2005/0127538 A1 | 6/2005 | Fabrega |
| 2005/0236541 A1 | 10/2005 | Chang |
| 2007/0001025 A1 | 1/2007 | Caserta et al. |
| 2007/0022582 A1 | 2/2007 | Carnevali |
| 2007/0075159 A1 | 4/2007 | Lin |
| 2007/0284500 A1 | 12/2007 | Fan |
| 2008/0190978 A1 | 8/2008 | Brassard |
| 2008/0224007 A1 | 9/2008 | Mo |
| 2009/0060473 A1 | 3/2009 | Kohte et al. |
| 2010/0019059 A1 | 1/2010 | Bulsink et al. |
| 2010/0187327 A1 | 7/2010 | Irvin |
| 2011/0019992 A1 | 1/2011 | Orf |
| 2011/0143583 A1 | 6/2011 | Zilmer et al. |
| 2011/0148352 A1 | 6/2011 | Wang et al. |
| 2011/0278885 A1 | 11/2011 | Procter et al. |
| 2012/0205503 A1 | 8/2012 | Kobal |
| 2012/0257346 A1 | 10/2012 | Hulet |
| 2013/0037590 A1 | 2/2013 | Yoon |
| 2014/0097306 A1 | 4/2014 | Hale et al. |
| 2014/0103087 A1 | 4/2014 | Fan |
| 2014/0138419 A1 | 5/2014 | Minn et al. |
| 2014/0183313 A1 | 7/2014 | McClain et al. |
| 2015/0072555 A1 | 3/2015 | Riddiford et al. |
| 2016/0082893 A1 | 3/2016 | Ormsbee et al. |
| 2016/0318455 A1 | 11/2016 | Zhang et al. |
| 2016/0347257 A1 | 12/2016 | Buchanan |
| 2016/0373152 A1 | 12/2016 | Schmidt |
| 2017/0035172 A1 | 2/2017 | Kim |
| 2017/0170858 A1 | 6/2017 | Tiller et al. |
| 2017/0313259 A1 | 11/2017 | Minn et al. |
| 2018/0043840 A1 | 2/2018 | Minn et al. |

FOREIGN PATENT DOCUMENTS

| | | |
|---|---|---|
| DE | 202004007340 U1 | 7/2004 |
| DE | 20208010276 U1 | 11/2008 |
| EP | 1031446 A1 | 8/2000 |
| EP | 1902736 A1 | 3/2008 |

(56) References Cited

FOREIGN PATENT DOCUMENTS

| EP | 2835957 | | 4/2015 |
|---|---|---|---|
| JP | 2003054304 | A | 2/2003 |
| JP | 3151546 | U | 6/2009 |
| JP | 3164223 | U * | 11/2010 |
| JP | D1415725 | | 5/2011 |
| JP | D1420793 | | 7/2011 |
| JP | D1420793 | | 8/2011 |
| JP | D1453628 | | 10/2012 |
| JP | D1487823 | | 1/2014 |
| KR | 10-2000-0044438 | | 7/2000 |
| KR | 20-0429528 | | 10/2006 |
| KR | 10-2012-0125933 | | 11/2012 |
| TW | D103373 | | 3/2005 |
| TW | D149647 | | 10/2012 |
| WO | WO 9604153 | | 2/1996 |
| WO | WO2004091673 | A1 | 10/2004 |
| WO | D066974-001 | | 9/2005 |
| WO | 2010002291 | A1 | 1/2010 |

OTHER PUBLICATIONS

Amendment dated Dec. 27, 2017, in U.S. Appl. No. 15/653,897, filed Jul. 19, 2017.
Final Office Action dated Feb. 15, 2018, in U.S. Appl. No. 15/653,897, filed Jul. 19, 2017.
Notice of Allowance dated Mar. 20, 2018, in U.S. Appl. No. 15/653,897.
Office Action dated Oct. 3, 2014, in U.S. Appl. No. 13/897,062, filed May 17, 2013.
Response to Office Action dated Nov. 3, 2014, in U.S. Appl. No. 13/897,062, filed May 17, 2013.
Office Action dated Dec. 4, 2014, in U.S. Appl. No. 13/897,062, filed May 17, 2013.
Response to Office Action dated May 5, 2015, in U.S. Appl. No. 13/897,062, filed May 17, 2013.
Notice of Allowance dated Jun. 8, 2015, in U.S. Appl. No. 13/897,062, filed May 17, 2013.
Preliminary Amendment dated Sep. 16, 2015, in U.S. Appl. No. 14/736,090, filed Jun. 10, 2015.
Office Action dated Sep. 22, 2016, in U.S. Appl. No. 14/736,090, filed Jun. 10, 2015.
Response to Office Action dated Oct. 21, 2016, in U.S. Appl. No. 14/736,090, filed Jun. 10, 2015.
Office Action dated Nov. 17, 2016, in U.S. Appl. No. 14/736,090, filed Jun. 10, 2015.
Response to Office Action dated Jan. 17, 2017, in U.S. Appl. No. 14/736,090, filed Jun. 10, 2015.
Advisory Action dated Feb. 2, 2017, in U.S. Appl. No. 14/736,090, filed Jun. 10, 2015.
Amendment dated Apr. 14, 2017, in U.S. Appl. No. 14/736,090, filed Jun. 10, 2015.
Amendment dated Jun. 15, 2017, in U.S. Appl. No. 14/736,090, filed Jun. 10, 2015.
Notice of Allowance dated Jun. 26, 2017, in U.S. Appl. No. 14/736,090, filed Jun. 10, 2015.
U.S. Appl. No. 29/599,624, filed Apr. 5, 2017.
U.S. Appl. No. 29/601,533, filed Apr. 24, 2017.
Office Action dated Sep. 27, 2017, in U.S. Appl. No. 15/653,897, filed Jul. 19, 2017.
Arkon Resources Inc., SMH429-SBH Universal Air Vent Swivel Mount with Adjustable Cradle, (downloaded from https://www.amazon.com/Arkon-Holder-iPhone-Galaxy-Retail/dp/B003XAF4YQ on Apr. 11, 2017, 9 pages).
Decision to Grant dated Jul. 5, 2016, in Russian Application No. 2015137589.
Exam Report, search report dated Apr. 22, 2016, in European Application No. 1477982383.
Office Action dated Apr. 14, 2016, in Korean Application No. 10-2015-7035564.

Office Action dated Jul. 14, 2016, in Korean Application No. 10-2015-7035564.
Notice of Allowance dated Aug. 23, 2016, in Korean Application No. 10-2015-7035564.
Web posting, entitled "[Arkon Air Vent Smartphone Car Mount] Review of SM429-SBH Air Vent Universal Smartphone Car Mount" (Publication Date: Nov. 21, 2010, http://cafe.naver.com/bjphone/1391925).
Web posting entitled, "Car Mount for Samsung Galaxy S4 Smartphone [Air Vent Smartphone Car Mount]" (Publication Date: Apr. 29, 2013, http://blog.naver.com/eeleet/130167208063).
The International Search Report and the Written Opinion dated Oct. 10, 2014; in PCT patent application No. PCT/US2014/038253, 12 pages.
Amendment filed Oct. 11, 2016, in European Application No. 147798238.3.
Amendment filed Dec. 8, 2016, in Mexican Application No. MX/a/2015/015365.
Amendment filed Dec. 20, 2016, in Mexican Application No. MX/a/2015/015365.
Office Action dated Nov. 9, 2016, in Mexican Application No. MX/a/2015/015365.
Search Report for Taiwanese Design Patent Application No. 103305833, completed date Apr. 16, 2015.
China Quality Suppliers; "Black or White Car Air Vent Mount Holder/Adjustable Universal Mobile Phone Stand Holder;" http://www.hebeimanjikefrp.com/sale-2307306-black-or-white-car-air-vent-mount-holder-adjustable-universal-mobile-phone-stand-holder.html; Copyright 2014-2015.
Exogear; "ExoMount Touch;" http://www.exogear.com/products-exomount-touch-one-touch-car-mount-holder.html; Copyright 2013 Exogear.
Search report dated Sep. 27, 2017, in European Application No. 17178044.8.
Pearl Automation, Pearl Magnetic Car Phone Mount—Vent or Dashboard Cell Phone Holder for Car or Truck, Publication Date: Sep. 2017 {earliest/exact publication date unknown}, https://www.amazon.com/Pearl-Magnetic-Car-Phone-Mount/dp/B01MODNYIV.
Elongdi, Elongdi Air Vent Magnetic Car Mount 360 Degree Rotating Car Phone Mount Holder Compatible with Phone 6 6S Plus 5 Galaxy S7 S6 edge S5 Sony HTC LG, Publication Date: Sep. 2017 {earliest/exact publication date unknown}, https://www.amazon.com/gp/product/B01LXY2N6R/ref=oh_aui_search_detailpage?ie=UTF8&psc=1.
Mengo, Magnetic Air Vent Car Mount—Aluma Magnetic Phone Holder—Universally Compatible for iPhone Samsung HTC LG Phones—Strong Magnetic Vent Mount, Publication Date: Sep. 2017 {earliest/exact publication date unknown}, https://www.amazon.com/gp/product/B01IFP01UA/ref=oh_aui_search_detailpage?ie=UTF8&psc=1.
Iottie, iOttie iTap Magnetic Air Vent Premium Car Mount Holder Cradle for iPhone X 8/8s 7 7 Plus 6s Plus 6s 6 SE Samsung Galaxy S8 Plus S8 Edge S7 S6 Note 8 5, Publication Date: Sep. 2017 {earliest/exact publication date unknown}, https://www.amazon.com/gp/product/B00Q3G8LPQ/ref=oh_aui_search_detailpage?ie=UTF8&psc=1.
AUKEY, AUKEY Car Mount Air Vent Magnetic Cell Phone Holder for iPhone 7/6S/Plus/Samsung/Mini Tablets and other Android, Windows Smartphones, Publication Date: Sep. 2017 {earliest/exact publication date unknown}, https://www.amazon.com/gp/product/B01B2R3QNW/ref=oh_aui_search_detailpage?ie=UTF8&psc=1.
SCOSCHE, SCOSCHE MAGVM2 MagicMount Vent Mount for Mobile Devices, Publication Date: Sep. 2017 {earliest/exact publication date unknown}, https://www.amazon.com/gp/product/B00PMOC172/ref=oh_aui_search_detailpage?ie=UTF8&psc=1.
Spinido, Spinido Magnetic Car Vent Mount Holder for iPhone 7/6s Plus/iPad mini, Publication Date: Sep. 2017 {earliest/exact publication date unknown}, https://www.amazon.com/gp/product/B01E58LHWC/ref=oh_aui_search_detailpage?ie=UTF8&psc=1.
Despert, Air Vent Car Phone Mount,Despert Universal Cell Phone Car Holder,Car Cradle for Apple iPhone 6 6s Plus SE,Samsung Galaxy S7 S6 Edge Note 5 4,Google Nexus & Other Smartphone-

(56) References Cited

OTHER PUBLICATIONS

Black, Publication Date: Sep. 2017 {earliest/exact publication date unknown}, https://www.amazon.com/gp/product/B01CZPWWX0/ref=oh_aui_search_detailpage?ie=UTF8&psc=1.

Just Mobile, Just Mobile the Ingenious 360 Degree Swivel Smartphone Car Vent Mount for iOS and Android Devices, Publication Date: Sep. 2017 {earliest/exact publication date unknown}, https://www.amazon.com/gp/product/B01N6CLFHM/ref=oh_aui_search_detailpage?ie=UTF8&psc=1.

IOTTIE, iOttie Easy One Touch Mini Air Vent Car Mount Holder Cradle for iPhone X 8/8s 7 7 Plus 6s Plus 6s 6 SE Samsung Galaxy S8 Plus S8 Edge S7 S6 Note 8 5 Nexus 6 & Smartphones, Publication Date: Sep. 2017 {earliest/exact publication date unknown}, https://www.amazon.com/iOttie-Holder-Cradle-Samsung-Smartphones/dp/B017HME9DC/ref=sr_1_6?s=wireless&ie=UTF8&clid=1507682834&sr=1-6&keywords=iottie.

Techmatte, Dashboard Mount TechMatte MagGrip Dashboard and Windshield Magnetic Universal Car Mount Holder for Smartphones including iPhone X, 8, 7, 6, 6S, Galaxy S8, S7, S7 Edge—Black, Publication Date: Sep. 2017 {earliest/exact publication date unknown}, https://www.amazon.com/Dashboard-TechMatte-Windshield-Universal-Smartphones/dp/B01780KZMW/ref=sr_1_5?.

Scosche, Scosche MAGWSM2 MagicMount Suction Mount for Mobile Devices, Publication Date: Sep. 2017 {earliest/exact publication date unknown}, https://www.amazon.com/Scosche-MAGWSM2-MagicMount-Suction-Devices/dp/B00R2K4LCY/ref=sr_1_18?s=wireless&ie=UTF8&qid=1507681675&sr=1-18&keywords=suction+cup+phone+mount.

IOTTIE, Car Mount, iOttie Easy View Universal Car Mount Holder for iPhone 7 6s 5s 5c, Samsung Galaxy S6 Edge Plus S6 S5 S4—Retail Packaging—Black, Publication Date: Sep. 2017 {earliest/exact publication date unknown}, https://www.amazon.com/iOttie-Universal-Holder-iPhone-Samsung/dp/B00B78MT44/ref=sr_1_15?s=wireless&ie=UTF8&qid=1507682778&sr=1-15&keywords=iottie.

Ztechworld, Ztechworld Universal Suction Cup Car Mount Mobile Phone Holder for iPhone 7 Plus 6S 6/ Samsung Galaxy S7 S6 Edge Note 3 4 5/ Android Phones and More, Sticky Silicone Base, 360 Rotation, Red Clip, Publication Date: Sep. 2017 {earliest/exact publication date unknown}, https://www.amazon.com/Ztechworld-Universal-Suction-Silicone-Rotation/dp/B06XGWRX9V/ref=sr_1_11?s=wireless&ie=UTF8&qid=1507681675&sr=1-11&keywords=suction+cup+phone+mount.

LAX Gadgets, LAX Universal Dashboard-mounted Smart Phone Holder with Non-Slip Grip Bracket—Compatible with Most Smartphones & Mini Tablets—360 Degrees Swivel Mount—Super Stable Suction Cup Car Mount, Publication Date: Sep. 2017 {earliest/exact publication date unknown}, https://www.amazon.com/LAX-Universal-Dashboard-mounted-Non-Slip-Bracket/dp/B073SKDVLW/ref=sr_1_43?s=wireless&ie=UTF8&qid=1507681896&sr=1-43&keywords=suction+cup+phone+mount.

IOTTIE, iOttie Easy View 2 Car Mount Holder for iPhone 7 7 Plus, 6s Plus 6s 5s 5c, Samsung Galaxy S8 S7 Edge Plus S7 S6, Note 5—Retail Packaging—Black, Publication Date: Sep. 2017 {earliest/exact publication date unknown}, https://www.amazon.com/iOttie-Holder-Samsung-Retail-Packaging/dp/B00JUXPHWE/ref=sr_1_13?s=wireless&ie=UTF8&qid=1507682834&sr=1-13&keywords=iottie.

Non-final Office Action dated Nov. 14, 2018, U.S. Appl. No. 15/722,286, filed Oct. 2, 2017.

* cited by examiner

ADJUSTABLE PORTABLE DEVICE HOLDER

PRIORITY CLAIM

This application is a continuation of U.S. patent application Ser. No. 15/653,897, filed Jul. 19, 2017 and titled ADJUSTABLE PORTABLE DEVICE HOLDER (issued as U.S. Pat. No. 9,956,923), which is a continuation of U.S. patent application Ser. No. 14/736,090, filed Jun. 10, 2015 and titled ADJUSTABLE PORTABLE DEVICE HOLDER (issued as U.S. Pat. No. 9,718,412), which is a continuation of U.S. patent application Ser. No. 13/897,062, filed May 17, 2013 and titled ADJUSTABLE PORTABLE DEVICE HOLDER (issued as U.S. Pat. No. 9,080,714), which is a continuation-in-part (CIP) of U.S. Design patent application Ser. No. 29/437,793, filed Nov. 20, 2012 and titled DASHBOARD VENT MOUNT FOR AN ELECTRONIC DEVICE (issued as U.S. Patent. No. Des. 690,707). Priority is claimed to each of the above listed applications, each of which is incorporated herein by reference.

FIELD OF TECHNOLOGY

The present application is directed to adjustable portable device holder systems and methods.

BACKGROUND

Various electronic and other device mounts are known in the art. Available device mounts have many drawbacks. For instance, suction cup mounts are typically large, bulky and require a large mounting surface such as a windshield. Device mounts often fail to properly and consistently attach to the mounting surface. Some device mounting solutions require adhesive to secure the mount to a vehicle dash, wearing off over time and leaving an undesirable residue on the mounting surface. Current device mounts also fail to effectively accommodate a broad range of devices or mounting surfaces.

Due to the deficiencies in the currently available device mounts, people choose not use electronic device mounts and often violate state and provincial hands-free driving laws. Other state and provincial laws prohibit objects mounted to the windshield to prevent obstruction of the drivers view.

This specification is directed to improved portable device holder systems and methods for manufacturing the same.

SUMMARY

Adjustable portable device holder systems and methods for manufacturing the same are herein disclosed. According to one embodiment, an adjustable portable device holder includes an adjustable clamping element and a rotatable mounting element attached to the adjustable clamping element for removably securing a portable device to the adjustable portable device holder. The adjustable clamping element is capable of being biased into an activated state and unbiased into a deactivated state to secure one of a plurality of different size portable devices to the adjustable portable device holder. The rotatable mounting element, attached to the adjustable clamping element, includes a plurality of mounting arms each spaced a specified distance apart from one another and extending at a specified angle from a bottom surface of the rotatable mounting element. Each pair of the plurality of mounting arms forms a mounting slot therein between. The rotatable mounting element is capable of being rotated to position a first mounting slot in a vertical, horizontal or diagonal orientation and a second mounting slot in a vertical, horizontal or diagonal orientation to engage a first mounting surface in a vertical, horizontal or diagonal orientation or a second mounting surface in a vertical, horizontal or diagonal orientation.

In another embodiment, a process for manufacturing an exemplary adjustable portable device holder is disclosed. The process includes providing an adjustable clamping element capable of being biased into an activated state and unbiased into a deactivated state to secure one of a plurality of portable device sizes to the adjustable portable device holder. The process also includes providing a rotatable mounting element comprising a plurality of mounting arms each spaced a specified distance apart from one another and extending at a specified angle from a bottom surface of the rotatable mounting element. Each pair of the plurality of mounting arms form a mounting slot therein between. The rotatable mounting element is capable of being rotated to position a first mounting slot in a vertical, horizontal or diagonal orientation and a second mounting slot in a vertical, horizontal or diagonal orientation to engage a first mounting surface in a vertical, horizontal or diagonal orientation or a second mounting surface in a vertical, horizontal or diagonal orientation. The process also includes attaching the rotatable mounting element to the adjustable clamping element.

The foregoing and other objects, features and advantages of the present disclosure will become more readily apparent from the following detailed description of exemplary embodiments as disclosed herein.

BRIEF DESCRIPTION OF THE DRAWINGS

Embodiments of the present application are described, by way of example only, with reference to the attached Figures, wherein.

DETAILED DESCRIPTION

Figure 1:
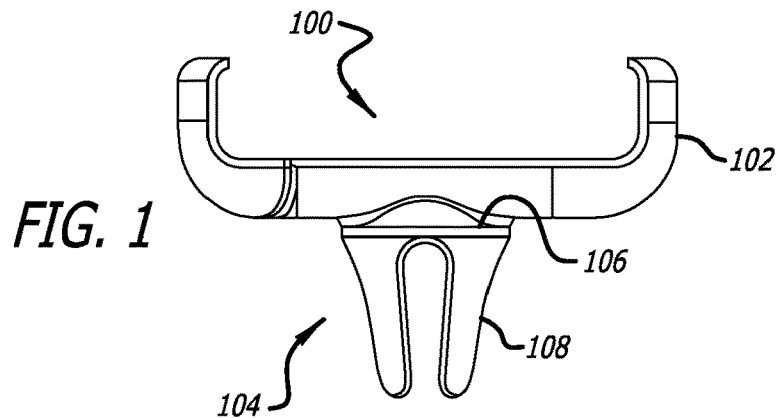
FIG. 1 illustrates an adjustable portable device holder in a retracted setting, also referred to as the deactivated state, according to one embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein.

The adjustable portable device holders described in this specification can include an adjustable clamping element attached to a rotatable mounting element. The adjustable portable device holder can be used to attach and mount a portable device to a mounting surface. The portable device can be any device that fits into the adjustable clamping element including, but not limited to a smartphone or other phone, a tablet, an e-reader, a powerbank, a speaker, a multimedia player, a flashlight or other light, a television or other display, a laser or radar detector, an air freshener, a fan, a beverage or other device that can fit into the adjustable clamping element. The adjustable portable device holder can be mounted to various mounting surfaces including, but not limited to an automobile air conditioner vent blade, an automobile dashboard, an automobile sun visor, a credit card, the brim of a hat, a counter, a tripod, a bicycle, a backpack, a utensil, a ledge or other surface.

FIG. 1 illustrates an adjustable portable device holder 100 in a retracted setting according to one embodiment. The adjustable portable device holder 100 includes an adjustable clamping element 102 attached to a rotatable mounting element 104.

Figure 2:
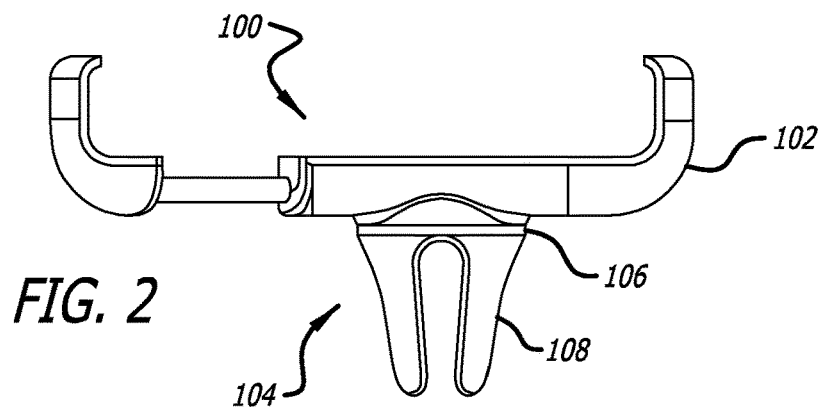
FIG. 2 illustrates an adjustable portable device holder in an expanded setting, also referred to as the activated state, according to one embodiment.

FIG. 2 illustrates an adjustable portable device holder 100 in an expanded setting according to one embodiment. The adjustable portable device holder 100 includes an adjustable clamping element 102 attached to a rotatable mounting element 104.

Figure 3:
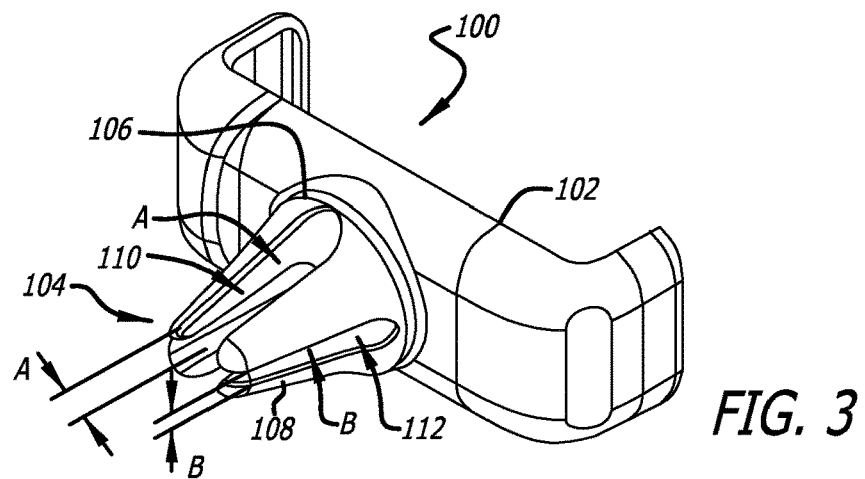
FIG. 3 illustrates an adjustable portable device holder in a retracted setting according to one embodiment.

FIG. 3 illustrates an adjustable portable device holder 100 in a retracted setting according to one embodiment. The adjustable portable device holder 100 includes an adjustable clamping element 102 attached to a rotatable mounting element 104.

The adjustable clamping element 102 illustrated in FIGS. 1-3 can be expanded and retracted to attach devices of different sizes to the adjustable portable device holder 100. A force can be applied to expand or bias the adjustable clamping element 102 into an activated state (shown in FIG. 2) and the force can be released to retract the adjustable clamping element 102 into a deactivated state (shown in FIGS. 1 and 3). An elastic retracting or biasing element (not shown), such as a compression or torsion spring can be incorporated into the adjustable clamping element 102. The compression or torsion spring facilitates the expansion and retraction of the adjustable clamping element 102 upon applying or releasing an expansive force on a surface of the adjustable clamping element 102.

The adjustable clamping element 102 can also include a gripping material on a surface of the adjustable clamping element 102 to provide a better grip, a better viewing angle or better attachment to a device secured within the adjustable clamping element 102. The gripping material can be applied to a portion of the adjustable clamping element 102 or the entire adjustable clamping element 102 can be made of the gripping material. The gripping material can be any material that increases the adhesion, grip or coefficient of friction between the gripping surface of the adjustable clamping element 102 and a surface of a device secured within the adjustable clamping element 102. The gripping material can include, but is not limited to rubber, polymeric material or other plastic, metal, alloy, fabric, composite material or other material capable of increasing the adhesion, grip or coefficient of friction between the gripping surface of the adjustable clamping element 102 and a surface of a device secured within the adjustable clamping element 102. The gripping material and gripping surface can be textured and composed of the same or different material.

The rotatable mounting element 104 illustrated in FIGS. 1-3 can be directly or indirectly attached to the adjustable clamping element 102. The adjustable clamping element 102 and the rotatable mounting element 104 can be one integral part or component parts that are attached together by any attaching means that allows the rotatable mounting element 104 to rotate. The rotatable mounting element 104 includes a base plate 106 and a plurality of mounting arms 108 extending from the base plate 106. The base plate 106 and the plurality of mounting arms 108 can be one integral part or component parts that are attached together by any attaching means.

Referring to FIG. 3, the base plate 106 can be a cylindrically shaped disc or other element that is capable of being rotated 360 degrees clockwise or counter-clockwise. The base plate 106 provides a rotating platform from which mounting arms 108 extend. The mounting arms 108 are spaced a specified distance apart relative to one another on the base plate 106. The mounting arms 108 also extend from the base plate 106 at a specified angle relative to the base plate 106. The size of the mounting arms 108, the distance between the mounting arms 108 and the angle at which the mounting arms 108 extend from the base plate 106 establish and define mounting slots 110, 112 between pairs of mounting arms 108. The rotatable mounting element 104 can include any number of mounting arms 108 and any number of mounting slots 110, 112.

The mounting arms 108 can also include a gripping material on a surface of the mounting arms 108 to provide a better grip, a better viewing angle or better attachment to a mounting surface secured between the mounting arms 108. The gripping material can be applied to a portion of mounting arms 108 or the entirety of the mounting arms 108 can be made of the gripping material. The gripping material can be any material that increases the adhesion, grip or coefficient of friction between the gripping surface of mounting arms 108 and a mounting surface secured between the mounting arms 108. The gripping material can include, but is not limited to rubber, polymeric material or other plastic, metal, alloy, fabric, composite material or other material capable of increasing the adhesion, grip or coefficient of friction between the gripping surface of mounting arms 108 and a mounting surface secured between the mounting arms 108. The gripping material and gripping surface can be textured and composed of the same or different material.

In one exemplary embodiment, the rotatable mounting element 104 includes four mounting arms and four mounting slots. In another exemplary embodiment, the rotating mounting element 104 includes 6 mounting arms and six mounting slots.

The mounting arms 108 and mounting slots 110, 112, can engage a mounting surface (not shown) to mount the adjustable portable device holder 100. The adjustable portable device holder 100 is mounted to a mounting surface by positioning, press fitting or wedging a mounting surface within one or more mounting slots 110, 112 to engage two or more mounting arms 108. The adjustable portable device holder 100 can be mounted to various mounting surfaces including, but not limited to an automobile air conditioner vent blade, an automobile dashboard, an automobile sun visor, a credit card, the brim of a hat, a counter, a tripod, a bicycle, a backpack, a utensil, a ledge or other surface that can be positioned, press fit or wedged within one or more mounting slots 110, 112 between two or more mounting arms 108.

The rotatable mounting element 104 can include any number of mounting arms 108 forming and defining any number of mounting slots 110, 112. As may be appreciated in at least FIGS. 1-3, 7, 8, 10, 11 15, 16, 18 and 19, the size and shape of the mounting slots 110, 112 formed between pairs of mounting arms 108 can be controlled by adjusting the size and shape of the paired mounting arms 108, the distance between the mounting arms 108 and the angle at which the two mounting arms 108 extend from the base plate 106 and converge toward one another. As depicted, each mounting arm 108 and mounting slot 110, 112 tapers in a direction away from a bottom surface of the rotatable mounting element 104. The rotatable mounting element 104 can include one or more different size mounting slots 110, 112 to accommodate different size mounting surfaces. For instance in FIG. 3, one mounting slot 110 having clearance A can be larger than another mounting slot 112 having clearance B. One or more of the mounting slots 110 formed on the rotatable mounting element 104 can accommodate a larger mounting surface than other mounting slots 112 formed on the rotatable mounting element 104.

The rotatable mounting element 104 can be rotated to position the mounting arms 108 and mounting slots 110, 112 in a horizontal plane, vertical plane, diagonal plane, circular plane, concave plane, convex plane or any plane between vertical and horizontal planes relative to the force of gravity. The mounting arms 108 and mounting slots 110, 112 can be positioned to engage a mounting surface in any engagement plane within the 360 degree rotation of the mounting element 104. The rotatable mounting element 104 can be rotated to position a relatively larger mounting slot 110 with clearance A in a horizontal, vertical, diagonal, circular, concave or convex plane to engage a relatively larger mounting surface in a horizontal, vertical, diagonal, circular, concave or convex engagement plane. The rotatable mounting element 104 can also be rotated to position a relatively smaller mounting slot 112 with clearance B in a horizontal, vertical, diagonal, circular, concave or convex plane to engage a relatively smaller mounting surface in a horizontal, vertical, diagonal, circular, concave or convex engagement plane.

The rotatable mounting element is capable of being rotated 360 degrees clockwise or counter-clockwise to engage different size mounting surfaces in a horizontal plane, vertical plane, diagonal plane, circular plane, concave plane, convex plane or any plane between vertical and horizontal planes. A device attached to the adjustable portable device holder 100 via the adjustable clamping element 102 can also be rotated 360 degrees clockwise or counter-clockwise while it is attached to the adjustable portable device holder 100 by rotating the rotatable mounting element 104.

Figure 4A:
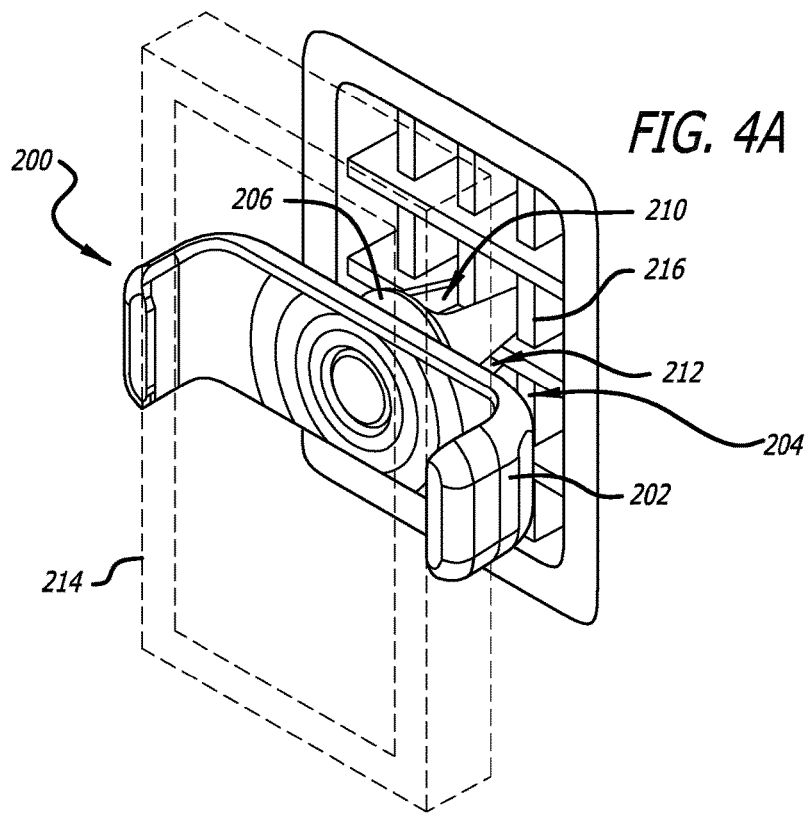
FIGS. 4A and 4B illustrate an adjustable portable device holder attached to a device and a mounting surface according to one embodiment.
Figure 4B:
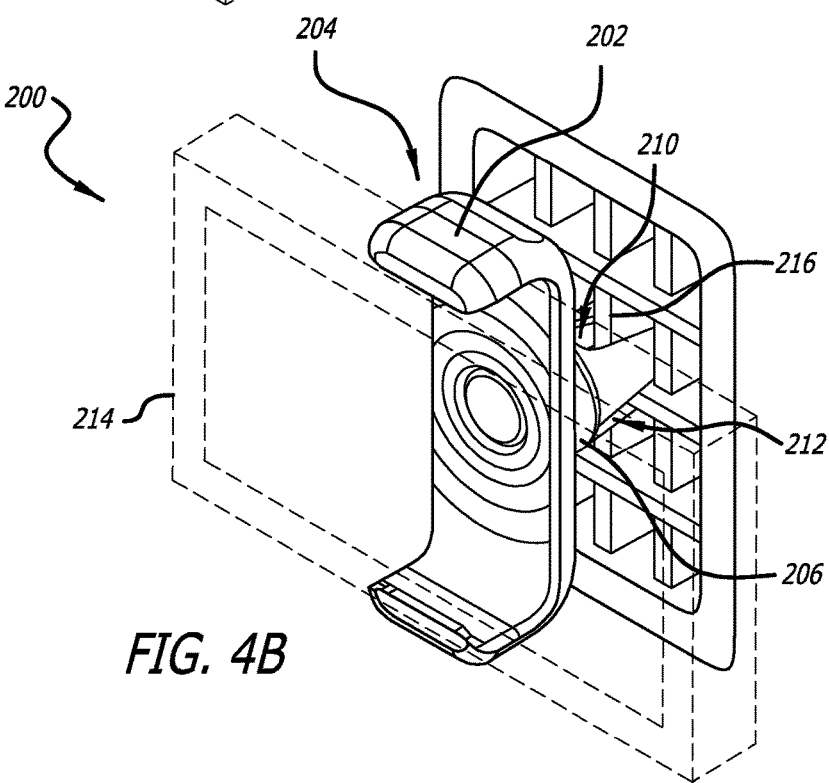

FIGS. 4A and 4B illustrate an adjustable portable device holder 200 attached to a device 214 and a mounting surface 216 according to one embodiment. The device 214 is a smart phone and the mounting surface 216 is an automobile air conditioner vent blade.

Other portable devices can also fit into the adjustable clamping element including, but not limited to a tablet, an e-reader, a powerbank, a speaker, a multimedia player, a flashlight or other light, a television or other display, a laser or radar detector, an air freshener, a fan, a beverage or other device. The adjustable portable device holder 200 can also be mounted to other mounting surfaces including, but not limited to an automobile dashboard, an automobile sun visor, a credit card, the brim of a hat, a counter, a tripod, a bicycle, a backpack, a utensil, a ledge or other surface.

The adjustable portable device holder 200 includes an adjustable clamping element 202 attached to a rotatable mounting element 204. The adjustable clamping element 202 can be expanded and retracted to attach different size smartphones to the adjustable portable device holder 200. A force can be applied to expand or bias the adjustable clamping element 202 into an activated state and the force can be released to retract the adjustable clamping element 202 into a deactivated state to clamp around the smartphone 214. An elastic retracting or biasing element (not shown), such as a compression or torsion spring can be incorporated into the adjustable clamping element 202 to facilitate the expansion and retraction of the adjustable clamping element 202 and to accommodate different size smartphones.

The adjustable clamping element 202 can also include a gripping material on a surface of the adjustable clamping element 202 to provide a better grip, a better viewing angle or better attachment to the smart phone 214 or other device secured within the adjustable clamping element 202. The gripping material can be applied to a portion of the adjustable clamping element 202 or the entire adjustable clamping element 202 can be made of the gripping material. The gripping material can be any material that increases the adhesion, grip or coefficient of friction between the gripping surface of the adjustable clamping element 202 and a surface of a device secured within the adjustable clamping element 202. The gripping material can include, but is not limited to rubber, polymeric material or other plastic, metal, alloy, fabric, composite material or other material capable of increasing the adhesion, grip or coefficient of friction between the gripping surface of the adjustable clamping element 202 and a surface of a device secured within the adjustable clamping element 202. The gripping material and gripping surface can be textured and composed of the same or different material.

The rotatable mounting element 204 can be directly or indirectly attached to the adjustable clamping element 202. The adjustable clamping element 202 and the rotatable mounting element 204 can be one integral part or component parts that are attached together by any attaching means, such as a screw, ratchet, pin, rod or friction or other device that allows the rotatable mounting element 204 to rotate. The rotatable mounting element 204 includes a base plate 206 and a plurality of mounting arms 208 extending from the base plate 206. The base plate 206 and the plurality of mounting arms 208 can be one integral part or component parts that are attached together by any attaching means.

The base plate 206 can be a cylindrically shaped disc or other element that is capable of being rotated 360 degrees clockwise or counter-clockwise. The base plate 206 provides a rotating platform from which the mounting arms 208 extend. The mounting arms 208 are spaced a specified distance apart relative to one another on the base plate 206. The mounting arms 208 also extend from the base plate 206 at a specified angle relative to the base plate 206. The size of the mounting arms 208, the distance between the mounting arms 208 and the angle at which the mounting arms 208 extend from the base plate 206 establish and define mounting slots 210, 212 between pairs of mounting arms 208. The rotatable mounting element 204 includes four mounting arms 208 and four mounting slots 210, 212.

The mounting arms 208 and mounting slots 210, 212, can engage and attach to an air conditioner vent blade 216 to mount the adjustable portable device holder 200. The adjustable portable device holder 200 is mounted to the air conditioner vent blade 216 by positioning, press fitting or wedging a surface of the air conditioner vent blade 216 within one or more mounting slots 210, 212 to engage two or more mounting arms 208.

The mounting arms 208 can also include a gripping material on a surface of the mounting arms 208 to provide a better grip, a better viewing angle or better attachment to the air conditioner vent blade 216 secured between mounting arms 208. The gripping material can be applied to a portion of mounting arms 208 or the entirety of the mounting arms 208 can be made of the gripping material. The gripping material can be any material that increases the adhesion, grip or coefficient of friction between the gripping surface of mounting arms 208 and an air conditioner vent blade 216 secured between the mounting arms 208. The gripping material can include, but is not limited to rubber, polymeric material or other plastic, metal, alloy, fabric, composite material or other material capable of increasing the adhesion, grip or coefficient of friction between the gripping surface of mounting arms 208 and the air conditioner vent blade 216 secured between the mounting arms 208. The gripping material can be and gripping surface and composed of the same or different material.

The rotatable mounting element 204 includes two different sizes of mounting slots 210, 212 to accommodate different size air conditioner vent blades 216 or other mounting surfaces. Two mounting slots 210 having clearance A are larger than the other two mounting slots 212 having clearance B.

The rotatable mounting element 204 can be rotated to position the mounting arms 208 and mounting slots 210, 212 in a horizontal, vertical, diagonal, circular, concave, convex or any plane between vertical and horizontal planes to engage air conditioner vent blades 216 oriented in a horizontal, vertical, diagonal, circular, concave, convex or any plane between vertical and horizontal planes. The mounting arms 208 and mounting slots 210, 212 can be positioned to attach to an air conditioner vent blade in any engagement plane within the 360 degree rotation of the mounting element 204. The rotatable mounting element 204 can be rotated to position the larger mounting slots 210 with clearance A in a horizontal, vertical, diagonal, circular, concave, convex or any plane between vertical and horizontal planes to engage or attach to larger air conditioner vent blades 216 oriented in a horizontal, vertical, diagonal, circular, concave, convex or any plane between vertical and horizontal planes. The rotatable mounting element 204 can also be rotated to position the smaller mounting slots 212 with clearance B in a horizontal, vertical, diagonal, circular, concave, convex or any plane between vertical and horizontal planes to engage or attach to smaller air conditioner vent blades 216 oriented in a horizontal, vertical, diagonal, circular, concave, convex or any plane between vertical and horizontal planes.

The rotatable mounting element 204 is capable of being rotated 360 degrees clockwise or counter-clockwise to engage different size mounting surfaces in a horizontal, vertical, diagonal, circular, concave, convex or any plane between vertical and horizontal planes relative to the force of gravity. The smart phone 214 attached to the adjustable portable device holder 200 can be rotated into a portrait orientation (shown in FIG. 4A) and a landscape orientation (shown in FIG. 4B) by rotating the rotatable mounting element 204. The smart phone 214 attached to the adjustable portable device holder 200 can be rotated 360 degrees clockwise or counter-clockwise while it is attached to the adjustable portable device holder 200 by rotating the smart phone 214 and adjustable clamping element 202, while the rotatable mounting element 204 is secured to a mounting surface.

Figure 5:
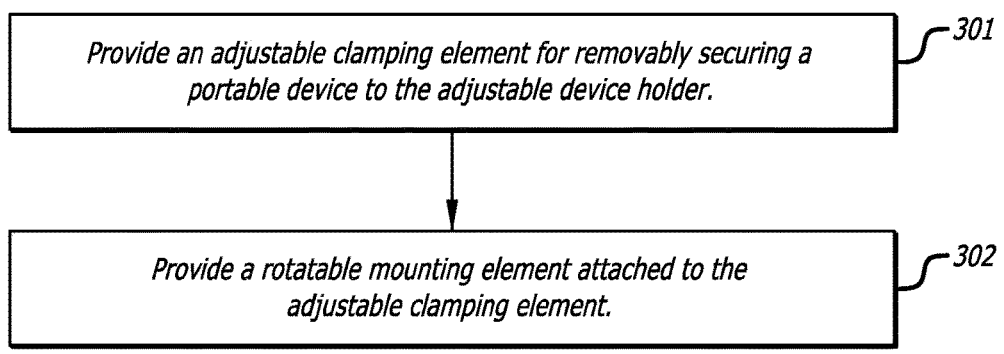
FIG. 5 illustrates a flow chart of a process for manufacturing an exemplary adjustable portable device holder according to one embodiment.
Figure 6:
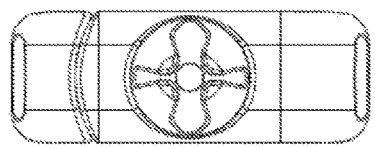
FIG. 6 is an elevation view of the back of an adjustable portable device holder in a retracted setting.
Figure 7:
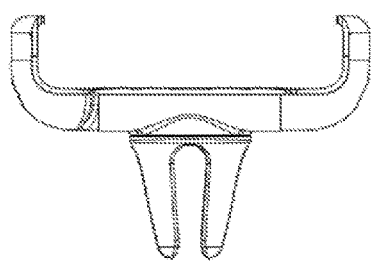
FIG. 7 is a plan view of the top of an adjustable portable device holder in a retracted setting.
Figure 8:
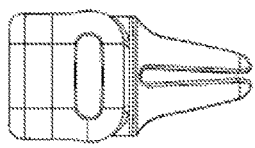
FIG. 8 is an elevation view of left side of an adjustable portable device holder in a retracted setting.
Figure 9:
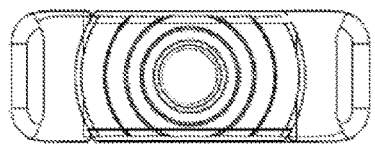
FIG. 9 is an elevation view of the front of an adjustable portable device holder in a retracted setting.
Figure 10:
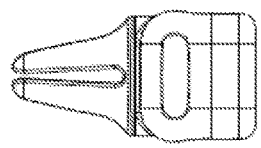
FIG. 10 is an elevation view of the right side of an adjustable portable device holder in a retracted setting.
Figure 11:
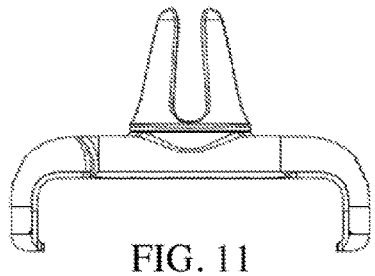
FIG. 11 is a plan view of the bottom of an adjustable portable device holder in a retracted setting.
Figure 12:
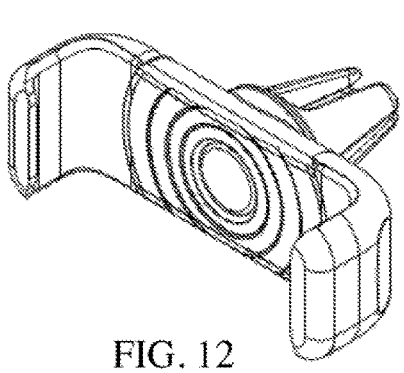
FIG. 12 is an isometric view, from the front right, of an adjustable portable device holder in a retracted setting.
Figure 13:
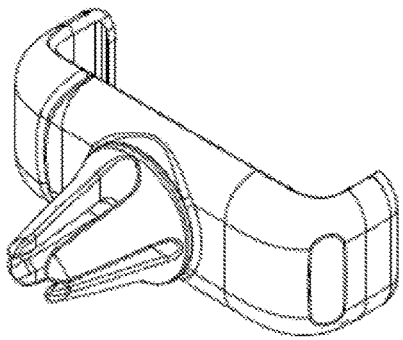
FIG. 13 is an isometric view, from the back left, of an adjustable portable device holder
Figure 14:
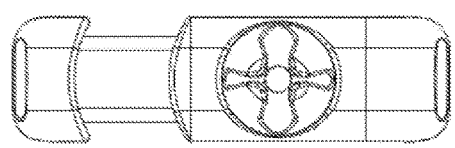
FIG. 14 is an elevation view of the back of an adjustable portable device holder in an expanded setting.
Figure 15:
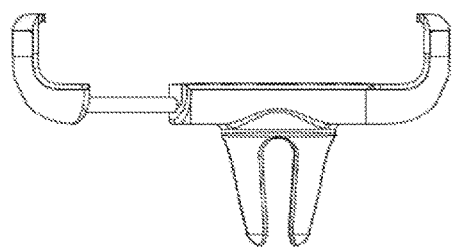
FIG. 15 is a plan view of the top of an adjustable portable device holder in an expanded setting.
Figure 16:
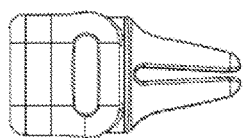
FIG. 16 is an elevation view of left side of an adjustable portable device holder in an expanded setting.
Figure 17:
FIG. 17 is an elevation view of the front of an adjustable portable device holder in an expanded setting.
Figure 18:
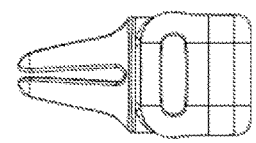
FIG. 18 is an elevation view of the right side of an adjustable portable device holder in an expanded setting.
Figure 19:
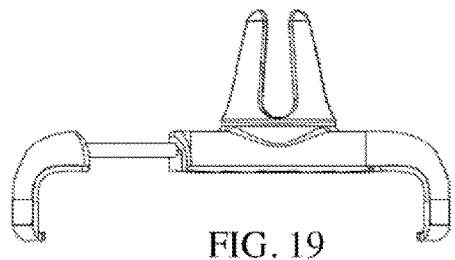
FIG. 19 is a plan view of the bottom of an adjustable portable device holder in an expanded setting.
Figure 20:
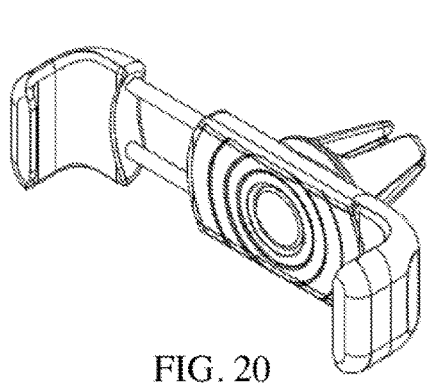
FIG. 20 is an isometric view, from the front right, of an adjustable portable device holder in an expanded setting.
Figure 21:
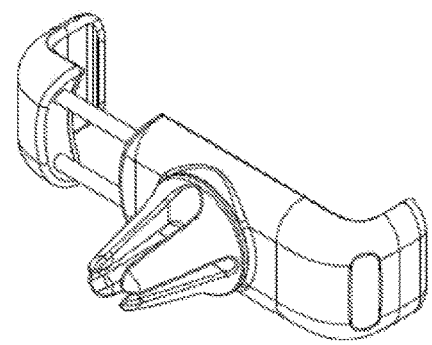
FIG. 21 is an isometric view, from the back left, of an adjustable portable device holder in an expanded setting.

FIG. 5 illustrates a flow chart of a process for manufacturing an exemplary adjustable portable device holder according to one embodiment. At step 301, the process includes providing an adjustable clamping element for removably securing a portable device to the adjustable portable device holder. The adjustable clamping element is capable of being biased into an activated state and unbiased into a deactivated state to secure one of a plurality of different size portable device to the adjustable portable device holder.

As an example and as depicted in FIGS. 2, 14, 15, 16 and 19-21, to manufacture the adjustable portable device holder, two stainless steel rods can be inserted into an expandable arm cavity of a double injection mold. PC/ABS is injected into the cavities of the mold to hold the rods in place and to produce an expandable arm, main body and cover of an adjustable clamping element. The mold is then rotated and injected with TPE to form side grips of the expandable arm and body of the adjustable clamping element. A stainless steel spring is inserted over each rod and held in place by a stainless steel screw affixed to the end of the rods. Grease is added to the lower portion of the spring and rods (near the screw head). The expandable arm is inserted into the body and the springs are lowered and held in place within the body of the adjustable clamping element. The cover is then slid on to the body to hold the adjustable arm in place.

The adjustable clamping element or a surface thereof can also be formed from rubber, polymeric material or other plastic, metal, alloy, or composite material that is rigid, semi-rigid or textured.

At step 302, a rotatable mounting element is provided, which can be attached to the adjustable clamping element via screw, ratchet, pin, rod or friction or other attachment means. The rotatable mounting element includes a plurality of mounting arms each spaced a specified distance apart from one another and extending at a specified angle from a bottom surface of the rotatable mounting element. Each pair of the plurality of mounting arms form a mounting slot therein between. The rotatable mounting element is capable of being rotated to position a first mounting slot in a vertical, horizontal or diagonal orientation and a second mounting slot in a vertical, horizontal or diagonal orientation to engage a first mounting surface in a vertical, horizontal or diagonal orientation or a second mounting surface in a vertical, horizontal or diagonal orientation.

For example, a rotatable mounting element can be formed in whole or part from stainless metal or other metal, alloy or plastic sheet stamped to form a clip or base plate with four arms extending from the base plate, spaced a specified distance apart and bent to a desired angle. If metal or other heat treatable material, the rotatable mounting element can be heat treated to form a rigid structure. The rotatable mounting element or a surface thereof can also be formed from rubber, polymeric material or other plastic, metal, alloy, or composite material that is rigid, semi-rigid or textured.

A zinc-alloy nut or other alloy or material can be formed using a die-cast mold to attach the rotatable mounting element to the adjustable clamping element. Glue is added to the cavity of the nut. The rotatable mounting element is affixed to the main body of the adjustable clamping element via the nut and a second stainless screw. A force gage is used to monitor the rotational force of the rotatable mounting element and the rotatable mounting element is adjusted if screw is too tight or loose.

TPE is injected into a mold to create a skirt and four socks. The skirt and four socks can also be formed from rubber, polymeric material or other plastic, metal, alloy, or composite material that is rigid, semi-rigid or textured. The skirt is assembled over the mounting arms of the rotatable mounting element. Glue is added to each mounting arm of the rotatable mounting element. A sock is inserted over each mounting arm, which holds the skirt in place.

Example embodiments have been described hereinabove regarding adjustable portable device holder systems and methods. Various modifications to and departures from the disclosed example embodiments will occur to those having ordinary skill in the art. The subject matter that is intended to be within the spirit of this disclosure is set forth in the following claims.

What is claimed is:

1. A portable device holder for use in attaching a smartphone to a vent blade within an automobile, the portable device holder comprising:
    an adjustable clamping element configured to be expanded and retracted to removably attach one of a plurality of different sized smartphones to the portable device holder;
    a frustoconical shaped vent mounting element divided into four segments that each define a respective vent mounting arm and that collectively define first and second mounting slots when the four vent mounting arms of the frustoconical shaped mounting element are not engaged with any vent blade within an automobile;
    the first and second mounting slots orthogonal to one another;
    the first mounting slot having a first clearance when the four vent mounting arms of the frustoconical shaped mounting element are not engaged with any vent blade within an automobile;
    the second mounting slot having a second clearance, which is greater than the first clearance, when the four vent mounting arms of the frustoconical shaped vent mounting element are not engaged with any vent blade within an automobile;
    the first and second clearances of the first and second mounting slots, respectively, enabling the portable device holder to be mounted to at least two different sized vent blades;
    the frustoconical shaped vent mounting element having first and second ends, with the first end having a greater circumference than the second end;
    the first end of the frustoconical shaped vent mounting element rotatably attached to the adjustable clamping element such that the vent mounting arms, which are defined by the four segments of the frustoconical shaped vent mounting element, extend in a direction away from the adjustable clamping element; and
    the second end of the frustoconical shaped vent mounting element being a free end that provides access to the first and second mounting slots to thereby enable the portable device holder to be mounted to at least two different sized vent blades;
    wherein rotation of the frustoconical shaped vent mounting element relative to the adjustable clamping element enables each of the first and second vent mounting slots to be selectively rotated between vertical and horizontal arrangements relative to the adjustable clamping element.

2. The portable device holder of claim 1, wherein the vent mounting arms, which are defined by the four segments of the frustoconical shaped vent mounting element, each converge towards a rotational axis of the frustoconical shaped vent mounting element.

3. The portable device holder of claim 1, wherein the first end of the frustoconical shaped vent mounting element is flush with a body of the adjustable clamping element.

4. The portable device holder of claim 1, wherein the frustoconical shaped vent mounting element is rotatably attached to the adjustable clamping element by a single pivot point such that the frustoconical shaped vent mounting element is centered relative to a height of the adjustable clamping element and remains centered relative to the height of the adjustable clamping element when the frustoconical shaped vent mounting element is rotated clockwise or counter-clockwise about the single pivot point relative to the adjustable clamping element.

5. The portable device holder of claim 4, wherein:
    the single pivot point is provided by a fastener that rotatably attaches the frustoconical shaped vent mounting element to the adjustable clamping element; and
    centers of the two different sized mounting slots are coextensive with one another and with the single pivot point about which the frustoconical shaped vent mounting element rotates relative to the adjustable clamping element.

6. A portable device holder for use in attaching a smartphone to a vent blade within an automobile, the portable device holder comprising:
    an adjustable clamping element including a main body and first and second clamp arms, the first clamp arm fixed relative to the main body, and the second clamp arm movable relative to the main body,
    the adjustable clamping element configured to be expanded and retracted by moving the second clamp arm relative to the main body, while the first clamp arm remains fixed relative to the main body, to removably attach one of a plurality of different sized smartphones to the portable device holder;

the adjustable clamping element configured to hold a smartphone widthwise, by clamping opposing sides of the smartphone, without contacting and otherwise obstructing a bottom of the smartphone and without contacting and otherwise obstructing a top of the smartphone;

a vent mounting element including a rotatable base plate that is flush with the main body of the adjustable clamping element, and from which extend four mounting arms in the direction away from the main body of the adjustable clamping element, the four mounting arms spaced apart from and converging towards one another to define at least two different sized mounting slots when the four vent mounting arms are not engaged with any vent blade within an automobile;

the vent mounting element rotatably attached to the adjustable clamping element such that the vent mounting arms extend away from the main body of the adjustable clamping element in a direction that is generally opposite a direction that the clamp arms extend from the main body of the adjustable clamping element;

the at least two different sized mounting slots, which accommodate engagement with at least two different sized vent blades, rotatable relative to the adjustable clamping element by rotating the vent mounting element at least one of clockwise or counterclockwise relative to the main body of the adjustable clamping element thereby enabling each of the at least two different sized mounting slots to be selectively rotated between vertical and horizontal arrangements relative to the adjustable clamping element;

the portable device holder having a front and a back;

the vent mounting arms of the vent mounting element and the at least two different sized mounting slots defined by the mounting arms hidden behind the main body of the adjustable clamping element and thus not viewable when the portable device holder is viewed from the front;

the adjustable clamping element having a width that increases when the adjustable clamping element is expanded, and having a height that is perpendicular to the width;

the vent mounting element rotatably attached to the adjustable clamping element by a single pivot point such that the rotatable vent mounting element is centered relative to the height of the adjustable clamping element and remains centered relative to the height of the adjustable clamping element when the vent mounting element is rotated clockwise or counter-clockwise about the single pivot point relative to the adjustable clamping element;

wherein centers of the at least two different sized mounting slots, defined by the vent mounting arms, are coextensive with one another and with the single pivot point about which the vent mounting element rotates relative to the adjustable clamping element; and wherein the single pivot point about which the vent mounting element rotates relative to the adjustable clamping element, and which is coextensive with the center of the at least two different sized mounting slots, is located along the width of the adjustable clamping element between the first and second clamp arms of the adjustable clamping element.

7. The portable device holder of claim 6, wherein the single pivot point is provided by a fastener that rotatably attaches the mounting element to the adjustable clamping element.

8. The portable device holder of claim 7, wherein the fastener includes a ratchet device, a screw, or a pin.

\* \* \* \* \*